April 11, 1967

M. FISCHMAN 3,313,957

PULSE GENERATOR WITH TRANSFORMER COUPLING OF CONTROLLED
RECTIFIER ELECTRODES TO EFFECT FREE-RUNNING
OR TRIGGERED OPERATION

Filed Feb. 26, 1965

INVENTOR.
MARTIN FISCHMAN

BY
R. J. Frank
ATTORNEY.

INVENTOR
MARTIN FISCHMAN
BY
R. J. Frank
ATTORNEY

United States Patent Office 3,313,957
Patented Apr. 11, 1967

3,313,957
PULSE GENERATOR WITH TRANSFORMER COUPLING OF CONTROLLED RECTIFIER ELECTRODES TO EFFECT FREE-RUNNING OR TRIGGERED OPERATION
Martin Fischman, Wantagh, N.Y., assignor to General Telephone and Electronics Laboratories, Inc., a corporation of Delaware
Filed Feb. 26, 1965, Ser. No. 435,541
8 Claims. (Cl. 307—88.5)

This invention relates to pulse generators and in particular to a highly stable solid-state pulse oscillator which can deliver current pulses of relatively large magnitude.

Many applications exist in electronic control systems for solid-state stable pulse generators capable of carrying large currents. Silicon controlled rectifiers (SCR's) have been used as the switching elements in such circuits since they can carry currents having peak values of hundreds of amperes or more. However, in known pulse generators of this type, a separate source of trigger pulses is generally required for proper operation. Self-oscillating circuits employing controlled rectifiers are also known but they are usually dependent upon the precision with which the rectifier can be switched by an increase in the anode-to-cathode voltage from its low conduction state to its high conduction or avalanche state. This method of switching the rectifier is significantly affected by variations in temperature and voltage and therefore it is difficult to obtain the desired frequency stability.

Accordingly, I have invented a pulse generator employing a controlled rectifier which can deliver high current pulses yet has excellent frequency stability. Further, my pulse generator employs a minimum number of components and can be arranged to function in either a free-running or a triggered mode of operation.

In the present invention, a pulse generator is provided which comprises a controlled rectifier having first, second and third electrodes. The first electrode of the rectifier is coupled to a common reference point, the second electrode to a first terminal on the first winding of a transformer and the third electrode to a first terminal on a second winding of the transformer. A first capacitor is coupled between a second terminal on the first winding of the transformer and the common reference point and a second capacitor is connected between a second terminal on the second transformer winding and the common reference point. Means are provided for coupling a positive voltage source across the first capacitor.

A load circuit is connected between the first and third electrodes of the controlled rectifier. This circuit may be primarily capacitive but preferably includes a nonlinear inductor to provide good control of the output pulse width.

The controlled rectifier is a well known commercially available device which exhibits a relatively small current between its first and third electrodes when the current flowing into its second electrode is small. When the second electrode (or gate) current is increased above a predetermined value by an amount sufficient to cause current to flow between the first electrode (cathode) and the third electrode (anode), the rectifier is driven into an "avalanche" or high conduction state. This change in state occurs when the applied electric field and gate currents are sufficient to cause the electrons to gain more energy between collisions than they lose to the lattice during the collisions. As a result, hole-electron pairs are generated thermally producing an avalanche of secondary electrons and holes through the material. Under these conditions, large current flows between anode and cathode until the rectifier is cut off by reducing the anode-to-cathode voltage to zero.

During the interpulse period, the voltage across the first capacitor increases slowly toward zero as it is charged by the positive voltage source. When the capacitor voltage exceeds zero, a small gate current begins to flow in the controlled rectifier. This gate current produces an increase in the anode current which is fed back to the gate until at some point on the rectifier characteristic sufficient positive feedback is obtained to produce substantial regeneration. This regeneration results in a rapid increase in the anode-to-cathode current thereby driving the anode toward zero and increasing the positive potential on the gate. As a result, the rectifier enters its low voltage high conductivity region and delivers a pulse to the load.

The transition of the rectifier from its low to high conductivity states is controlled by the increasing gate current rather than by an increase in the anode-to-cathode voltage. Consequently, the duration of the interpulse period is determined much more precisely than in known circuits which utilize the anode switching characteristic of the controlled rectifier.

Following generation of the pulse, the first capacitor (which was charged negatively) during the portion of the cycle when gate current was flowing maintains the rectifier in a nonconducting state until the voltage across it again rises above zero.

The above objects of and the brief introduction to the present invention will be more fully understood and further objects and advantages will become apparent from a study of the following description in connection with the drawings wherein.

Figure 1:
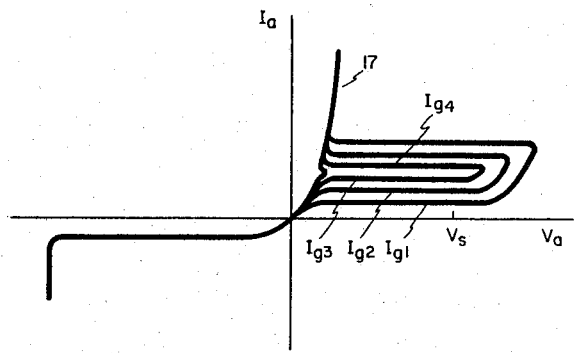
FIG. 1 shows a current-voltage characteristic of a typical silicon controlled rectifier.

FIG. 1 illustrates the voltage-current characteristic of a typical type PNPN silicon controlled rectifier (hereinafter referred to as an SCR) such as is shown at 10 in the schematic diagram of FIG. 2. SCR 10 comprises three rectifying junctions 14, 15 and 16 which divide the device into four alternating regions of P and N type semiconductor material. It is further provided with a cathode electrode 11, an anode electrode 12 and a gate electrode 13, the electrodes being affixed to their respective semiconductor regions by ohmic contacts.

The impedance between the cathode 11 and anode 12 is initially very high and the rectifier is essentially nonconducting in both directions. When current is caused to flow into the gate by application of a suitable signal to the gate electrode 13, the anode current increases in a manner analogous to the increase in transistor collector current when the base current of a transistor is increased. If the gate current exceeds a predetermined value, the impedance of the rectifier drops sharply and the anode current is limited essentially only by the load. The input signal loses control after breakdown, the rectifier being cut off by reducing the anode-to-cathode voltage until the forward current falls below the value required to maintain conduction.

This is illustrated in FIG. 1 which shows that with a D.C. voltage $V_s$ connected between the anode and cathode of an SCR, the anode current remains low as long as the gate current does not exceed $I_{g3}$. In this region, the SCR has characteristics resembling those of a transistor. When the gate current is increased to a value between $I_{g3}$ and $I_{g4}$ however, the SCR exhibits a negative resistance, the anode-to-cathode impedance of the SCR falls to a very low value, the voltage across it is reduced and the anode current $I_a$ increases sharply. Under these breakdown conditions, the voltage across the SCR and the current through it vary along the portion 17 of the characteristic curve of FIG. 1. Since the gate loses control of conduction under these conditions, the SCR is returned to its high impedance state by reducing the anode-to-cathode voltage to substantially zero.

Returning now to FIG. 2, one end of winding 18 of a transformer 19 is coupled through a resistor 20 to the gate 13 of SCR 10. The other end of winding 18 is coupled through a diode 21 and capacitor 22 to the cathode 11 of SCR 10. The cathode 11 of the SCR is grounded to provide a voltage reference. Whenever the voltage at a particular point in the circuit is referred to, it shall be understood that the voltage is measured between that point and ground.

A second winding 23 on transformer 19 has one end connected to the anode 12 of SCR 10 and the other coupled to the cathode 11 through a second capacitor 24 and a resistor 25. The positive terminal of a D.C. voltage source $V_s$ is coupled through a resistor 26 to anode 12 and the negative terminal of the source is connected to the cathode 11. The junction of diode 21 and capacitor 22 is coupled through two resistors 27 and 28 to the junction of voltage source $V_s$ and resistor 26. Resistor 28 is made variable to provide control of the oscillator frequency.

A load circuit comprising a nonlinear inductor 29, a capacitor 30 and a resistor 31 is connected between the anode and cathode of SCR 10.

The operation of the oscillator will now be described with reference to the waveform diagrams of FIGS. 3 and 4A to 4D. The letters A to D in FIG. 4 refer to correspondingly designated points on the circuit diagram of FIG. 2 and show the voltage or current at those points.

Figure 3:
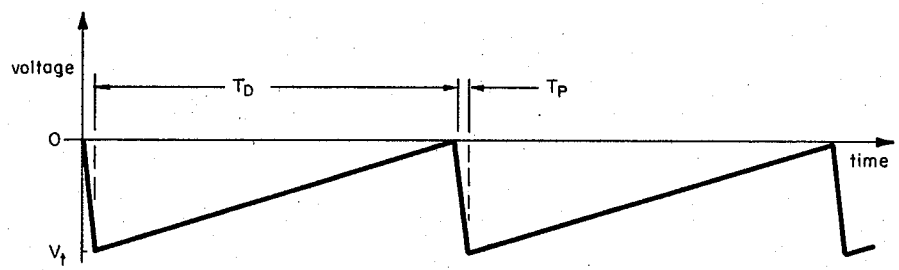
FIGS. 3 and 4A to 4D are plots of the voltage and current waveform at various points in the circuit of FIG. 2.
Figure 4:
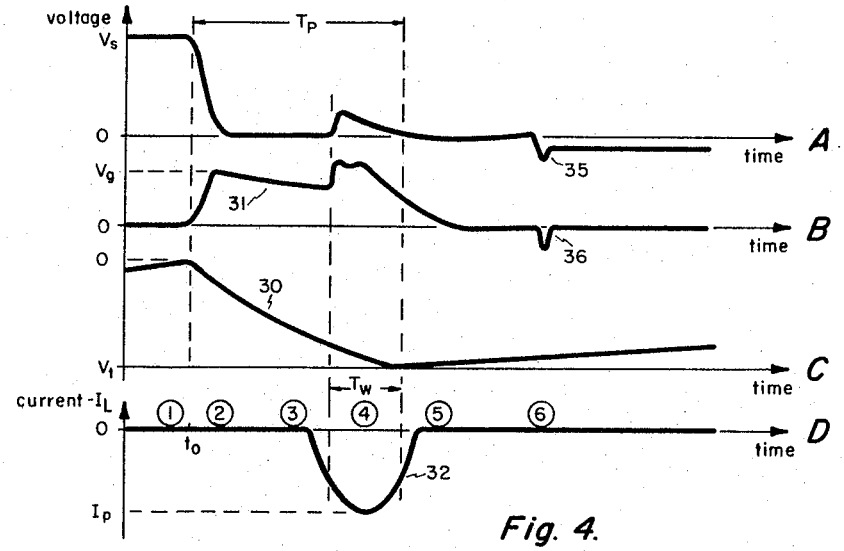

The sawtooth waveform of FIG. 3 represents the voltage across capacitor 22. As shown, the voltage across capacitor 22 increases in a substantially linear manner during the interpulse period $T_D$ as the capacitor is charged by voltage source $V_s$ through resistors 27 and 28. When the voltage across capacitor 22 reaches zero, the pulse period $T_P$ begins and the capacitor voltage drops sharply to a negative value after which it again begins a slow increase toward zero.

Figure 2:
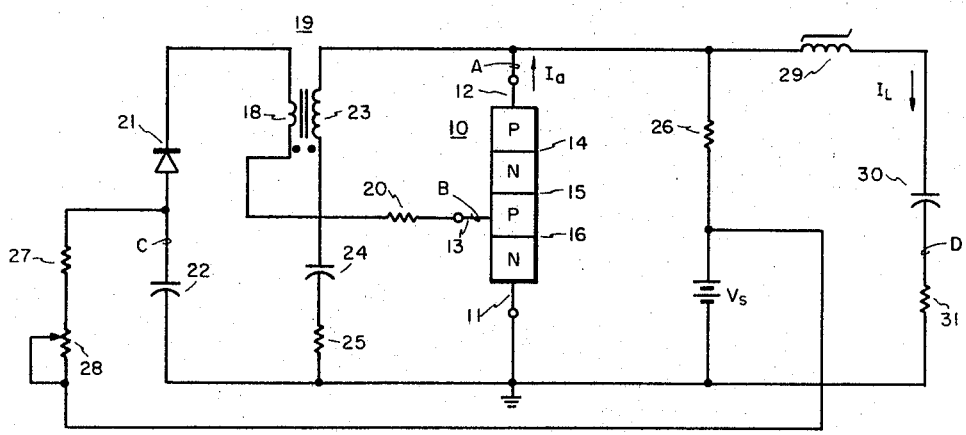
FIG. 2 is a schematic diagram illustrating one embodiment of the invention.

Referring now to FIGS. 4A to 4D the waveforms A to C show the voltages at points A to C of FIG. 2 during the pulse period $T_P$ and waveform D depicts the current flowing at point D. In the portion of the cycle just prior to $t_0$, SCR10 is cut off, the voltage at point A is approximately equal to the D.C. source voltage $V_s$ and the gate voltage at point B is slightly negative. As capacitor 22 is charged by source $V_s$ through resistors 27 and 28, its voltage rises at time $t_0$ to slightly above zero causing diode 21 to conduct making the gate electrode 13 of SCR 10 positive. Current begins to flow into gate 13 and when it is of sufficient magnitude to cause the impedance of SCR 10 to drop in the manner explained in conjunction with FIG. 1, the voltage at point A begins to drop and the anode current $I_a$ increases. The increase in anode current produces an increase in the current through winding 23 of transformer 19 and a corresponding increase in the current in winding 18. The relative polarities of the transformer windings 18 and 19 are selected (as indicated by the dots) so that the current into gate 13 also increases producing a further increase in anode current. This regenerative action continues until the anode voltage at point A is reduced to a very small value and the gate voltage at point B has increased to $V_g$.

The flow of gate current charges capacitor 22 in a negative direction as shown at 30 in FIG. 4C, the charge on the capacitor maintaining the oscillator cut-off during the interpulse period $T_D$. Diode 21 isolates the negative charge on capacitor 22 from the gate electrode 13 thereby preventing SCR 10 (which is in a conductive state for a short time after capacitor 22 stops charging) from discharging the capacitor. Consequently, a large negative timing wave is developed across capacitor 22 resulting in extremely accurate frequency control of the oscillator.

Capacitor 24, which provides the energy source for the oscillator pulse, is charged during the interpulse period. The base drive shown at 31 in FIG. 4B is provided by the current flow from capacitor 24 as it discharges. Resistors 20 and 25 serve to limit the current flow in windings 18 and 23 respectively of transformer 19.

At the beginning of the interval $T_P$, the gate current magnitude is increased until the negative resistance region of the SCR is traversed and the low voltage, high current region is reached. The transition from a high voltage $V_s$ at point A to a very low voltage is accomplished at a low current level due to the nonlinearity of inductor 29 and consequently the heat dissipation is kept within reasonable limits. This is of great importance in pulse generators of this type since, if the high voltage switching wave is accompanied by a high current, the peak power dissipation might be sufficient to damage the silicon controlled rectifier 10.

During the interpulse period $T_P$, capacitor 30 is charged by voltage source $V_s$. The actual switching of the energy stored in capacitor 30 through the load resistor 31 is accomplished by a rapid reduction in the inductance of nonlinear inductor 29.

Figure 5:
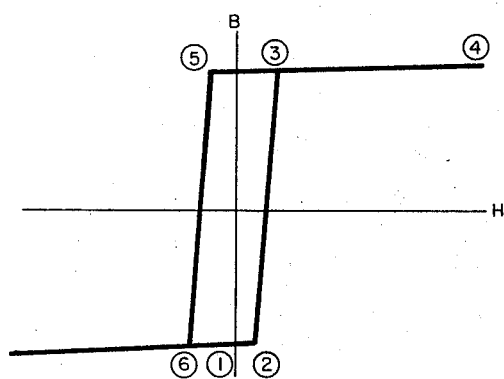
FIG. 5 is a plot of the flux density vs. field intensity for a nonlinear inductor of the type used in the load circuit of FIG. 2.

The relation between the flux density B and magnetic field intensity H for inductor 29 is shown in FIG. 5. The numerals $\underline{1}$ to $\underline{6}$ indicate the flux density and magnetic field intensity at the times indicated by the corresponding numerals in FIG. 4. At time $\underline{1}$ just before SCR 10 becomes conductive (at $t_0$) the field intensity H is zero and the flux density in inductor 29 has its maximum negative value. When the anode potential of SCR 10 falls toward zero, a current starts to flow through inductor 29. The inductance of inductor 29 from times $\underline{1}$ to $\underline{2}$ is low since the ratio of the change in flux to change in current is very small as indicated by the slope of the B–H curve in this interval. However, when the current level $\underline{2}$ is reached the inductance of inductor 29 abruptly changes to a high value and the current increases very slowly to point $\underline{3}$. The current flowing through inductor 29, in going from $\underline{1}$ to $\underline{3}$, is a very small fraction of the current that flows during the generation of the high current pulse.

When point $\underline{3}$ is passed, an abrupt change to low inductance occurs as shown in FIG. 5 and the current increases at a high rate forming the initial edge of the pulse as illustrated in FIG. 4D. The shape of the pulse 32 is determined by the transient response of the circuit comprising inductor 29 in its low inductance state, capacitor 30 and resistor 31. In a typical circuit having the circuit values given hereinafter, the peak current through the load $I_L$ is about 100 amperes and the pulse width at half amplitude is about 5 microseconds.

After the trailing edge of the pulse has been generated, the load current reverses and at point $\underline{5}$ inductor 29 changes abruptly to its high inductance state. From this point on, the SCR current increases very slowly and the output current $I_L$ reverses direction. However, the reverse current is a very small fraction of the forward pulse current (about 0.01 $I_L$) and therefore does not appear on the waveform diagram. This current is passed by SCR 10 in its reverse direction (anode to cathode) due to the presence of stored carriers available from the previous high current pulse.

When point $\underline{6}$ is reached the SCR current $I_a$ tends to abruptly increase due to the switching of the inductor 29 to its low inductance state. This accounts for the small voltage pulse shown at 35 and 36 in FIGS. 4A and 4B.

respectively. The current reversal quickly sweeps out the remaining carriers thereby rendering SCR 10 non-conducting and reducing the load current to zero. The current through inductor 29 now falls to zero at point 1 and is reset for the next cycle of operation. Capacitor 30 is charged negatively at this point (i.e. point D is positive with respect to the junction between capacitor 30 and inductor 29) due to the oscillating current flow therethrough. This negative voltage appears at point A and results in removal of the remaining carriers and complete recovery and turn-off of SCR 10. The energy storage capacitor 30 now starts to recharge through resistor 26 for the next pulse.

Typical values for the circuit of FIG. 2 are as follows:

| | |
|---|---|
| SCR 10 | Type GE 2N1935 |
| Transformer 19 turns ratio (winding 18 to winding 23) | 1:3 |
| Resistor 20 ohms | 27 |
| Diode 21 | Type 1N279 |
| Capacitor 22 microfarad | 0.1 |
| Capacitor 24 do | 0.02 |
| Resistor 25 ohms | 3.3 |
| Resistor 26 do | 10,000 |
| Resistor 27 do | 56,000 |
| Resistor 28 megohms max | 5 |
| Inductor 29 | Nonlinear |
| Capacitor 30 microfarad | 0.25 |
| Resistor 31 ohm | 1 |
| Supply voltage $V_s$ volts | 400 |

Using the above circuit parameters, a current pulse was obtained through resistor 31 having an amplitude $I_P$ of 100 amperes and a pulse width at half amplitude of about 5 microseconds. The interpulse period $T_D$ was about 0.01 second but can be varied within relatively wide limits by adjusting the setting of resistor 28. The maximum voltage at point C indicated as $V_t$ in FIG. 4C is −20 volts and the voltage $V_g$ (FIG. 4B) is +5 volts.

Figure 6:
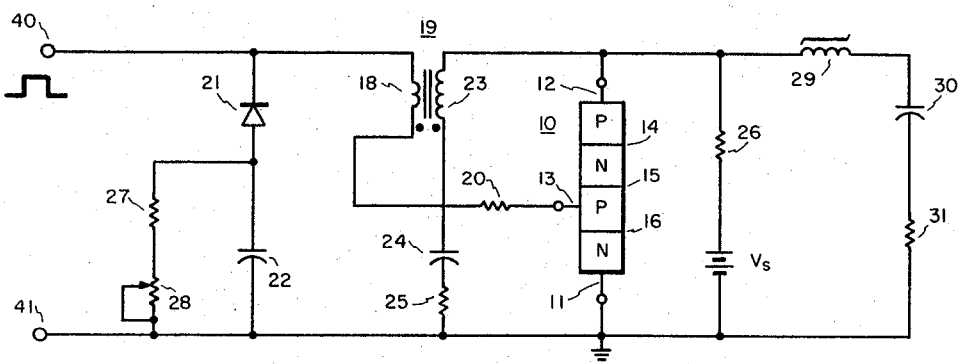
FIG. 6 is a schematic diagram of another embodiment of the invention arranged for triggered operation.

FIG. 6 depicts the circuit arranged for triggered operation. This circuit differs from that of FIG. 2 only in that the resistors 27 and 28 are connected between the junction of rectifier 21 and capacitor 22 and the negative terminal of D.C. source $V_s$ rather than the positive terminal of the voltage source. In addition, terminals 40 and 41 are added to permit a positive triggering pulse to be applied between the junction of diode 21 and winding 18 of transformer 19 and ground.

With this arrangement, the circuit is normally quiescent and SCR 10 is in its non-conducting state. When a positive pulse is applied to the circuit, gate electrode 13 is driven positive, SCR 10 becomes conductive, regeneration commences and the circuit operates in the manner described in connection with FIG. 2. However, capacitor 22 remains negative at the end of the pulse period $T_D$ since it is not charged by the D.C. source.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A pulse generator comprising
  (a) a controlled rectifier having first, second and third electrodes,
  (b) a transformer having first and second windings, one terminal on the first winding of said transformer being coupled to the second electrode of said controlled rectifier and one terminal on the second winding of said transformer being coupled to the third electrode of said rectifier,
  (c) first and second capacitors, said first capacitor being coupled between a second terminal on said first transformer winding and the first electrode of said controlled rectifier and said second capacitor being coupled between a second terminal on said second transformer winding and the first electrode of said rectifier, and
  (d) load means coupled between the first and third electrodes of said rectifier.

2. A pulse generator comprising
  (a) a controlled rectifier having first, second and third electrodes,
  (b) a transformer having first and second windings, one terminal on the first winding of said transformer being coupled to the second electrode of said controlled rectifier and one terminal on the second winding of said transformer being coupled to the third electrode of said rectifier,
  (c) first and second capacitors, said first capacitor being coupled between a second terminal on said first transformer winding and the first electrode of said controlled rectifier and said second capacitor being coupled between a second terminal on said second transformer winding and the first electrode of said rectifier,
  (d) means for coupling a voltage source between the first and third electrodes of said controlled rectifier,
  (e) resistor means for coupling said voltage source to said first capacitor, and
  (f) load means coupled between the first and third electrodes of said rectifier.

3. A pulse generator comprising
  (a) a controlled rectifier having first, second and third electrodes,
  (b) a transformer having first and second windings, one terminal on the first winding of said transformer being coupled to the second electrode of said controlled rectifier and one terminal on the second winding of said transformer being coupled to the third electrode of said rectifier,
  (c) first and second capacitors, said first capacitor being coupled between a second terminal on said first transformer winding and the first electrode of said controlled rectifier and said second capacitor being coupled between a second terminal on said second transformer winding and the first electrode of said rectifier,
  (d) means for coupling a voltage source between the first and third electrodes of said controlled rectifier,
  (e) resistor means for coupling said voltage source to said first capacitor, and
  (f) load means coupled between the first and third electrodes of said rectifier, said load means including a third capacitor.

4. A pulse generator comprising
  (a) a controlled rectifier having first, second and third electrodes,
  (b) a transformer having first and second windings, one terminal on the first winding of said transformer being coupled to the second electrode of said controlled rectifier and one terminal on the second winding of said transformer being coupled to the third electrode of said rectifier,
  (c) a diode having one end coupled to a second terminal on said first transformer winding,
  (d) first and second capacitors, said first capacitor being connected between the other end of said diode and the first electrode of said controlled rectifier and said second capacitor being coupled between a second terminal on said second transformer winding and the first electrode of said rectifier,
  (e) means for coupling a voltage source between the first and third electrodes of said controlled rectifier,
  (f) resistor means for coupling said voltage source to said first capacitor, and
  (g) load means coupled between the first and third electrodes of said rectifier.

5. A pulse generator as defined by claim 4 wherein said diode is poled to have high conductivity for current flowing from said first capacitor to the first winding of said transformer.

6. A pulse generator comprising
(a) a silicon controlled rectifier having cathode, gate and anode electrodes,
(b) a transformer having first and second windings, one end of said first winding being coupled to the gate electrode of said rectifier and one of said second winding being coupled to the anode electrode of said rectifier,
(c) a diode having one end coupled to the other end of said first winding,
(d) first and second capacitors, said first capacitor being connected between the other end of said diode and the cathode electrode of said rectifier and said second capacitor being coupled between the other end of said second winding and the cathode electrode of said rectifier,
(e) a voltage source resistor having one end connected to the anode of said rectifier,
(f) means for coupling a direct voltage source between the other end of said voltage source resistor and the cathode of said rectifier,
(g) charging resistor means coupled between the junction of said diode and said first capacitor and the junction of said D.C. source and said source resistor, and
(h) load means coupled between the anode and cathode of said rectifier, said load means including a third capacitor and a nonlinear inductor.

7. A pulse generator comprising
(a) a silicon controlled rectifier having cathode, gate and anode electrodes,
(b) a transformer having first and second windings,
(c) a gate resistor connected between one end of said first winding and the second electrode of said rectifier,
(d) a diode having one end connected to the other end of said first winding, said diode being poled to have high conductivity for current flowing from said diode into said first winding,
(e) a first capacitor, said first capacitor being connected between the other end of said diode and the cathode of said rectifier,
(f) a second capacitor,
(g) a current limiting resistor, said second winding, second capacitor and current limiting resistor being connected in series between the cathode and anode of said rectifier,
(h) a voltage source resistor having one end connected to the anode of said rectifier,
(i) means for coupling a direct voltage source between the other end of said source resistor and the cathode of said rectifier,
(j) charging resistor means coupled between the junction of said diode and said first capacitor and the junction of said D.C. source and said source resistor, and
(k) load means coupled between the anode and cathode of said rectifier, said load means including a third capacitor, a nonlinear inductor and a resistor connected in series.

8. A pulse generator comprising
(a) a silicon controlled rectifier having cathode, gate and anode electrodes,
(b) a transformer having first and second windings, one end of said first winding being coupled to the gate electrode of said rectifier and one of said second winding being coupled to the anode electrode of said rectifier,
(c) a diode having one end coupled to the other end of said first winding,
(d) first and second capacitors, said first capacitor being connected between the other end of said diode and the cathode electrode of said rectifier and said second capacitor being coupled between the other end of said second winding and the cathode electrode of said rectifier,
(e) a voltage source resistor having one end connected to the anode of said rectifier,
(f) means for coupling a direct voltage source between the other end of said source resistor and the cathode of said rectifier,
(g) charging resistor means coupled across said first capacitor,
(h) first terminal means connected to the junction between said diode and said first winding and second terminal means connected to the cathode of said rectifier for applying a trigger pulse to said circuit, and
(i) load means coupled between the anode and cathode of said rectifier, said load means including a third capacitor and a nonlinear inductor.

No references cited.

ARTHUR GAUSS, *Primary Examiner.*

S. D. MILLER, *Assistant Examiner.*